Figure 1:
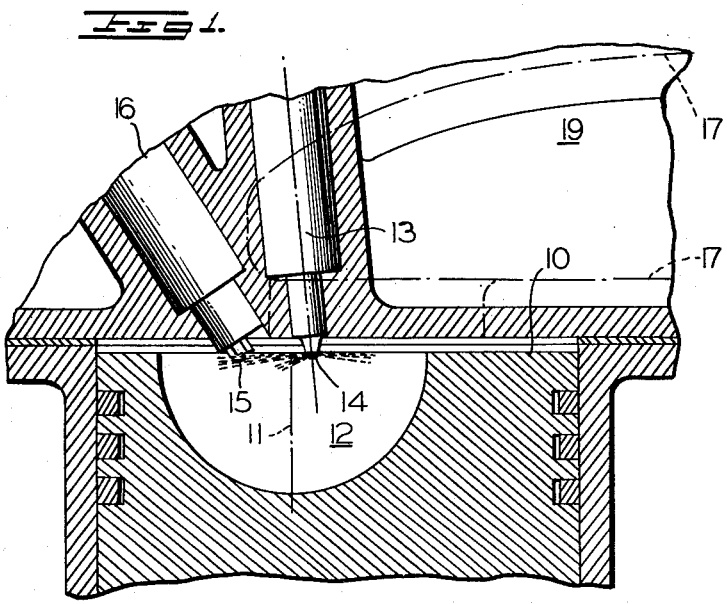

March 17, 1964   H. HOFFMANN   3,125,080
INTERNAL COMBUSTION ENGINE
Filed March 20, 1961

INVENTOR
HEINRICH HOFFMANN

BY *Dicke, Craig & Freudenberg*
ATTORNEYS

United States Patent Office 3,125,080
Patented Mar. 17, 1964

3,125,080
INTERNAL COMBUSTION ENGINE
Heinrich Hoffmann, Stuttgart-Unterturkheim, Germany, assignor to Daimler-Benz Aktiengesellschaft, Stuttgart-Unterturkheim, Germany
Filed Mar. 20, 1961, Ser. No. 96,986
Claims priority, application Germany Apr. 1, 1960
4 Claims. (Cl. 123—32)

The present invention relates to an internal combustion engine provided with externally controlled ignition, with an air vortex or eddy about an axis extending in the longitudinal direction of the piston, with a compact piston combustion chamber at least approximately axially symmetrical about a longitudinal axis and with an injection from within the area of the longitudinal axis of the piston combustion chamber, preferably by means of a multi-apertured nozzle.

The present invention essentially consists in such a matching between the strength of the air vortex or air eddy and the pentrating power of the initially essentially radially moving fuel particles that the fuel particles fail to reach the cylinder walls, possibly even the combustion chamber walls of the piston with the piston in the upper dead center position or thought of in the upper dead center position but, instead, are deflected prior thereto in the circumferential direction.

In this manner, the fuel, preferably gasoline, is more heavily concentrated within the center of the combustion space whereas zones are formed along the outer periphery consisting essentially of pure air or at least zones very lean in fuel.

Such an arrangement is advantageous from a two-fold point of view with a timed externally controlled ignition, namely:

(1) In those places of the combustion chamber furthest removed from the place of externally controlled ignition, i.e., from the electrodes of the spark plug, in which there exists, as such, the greatest danger of self-ignition before being reached by the expanding flame front produced by the controlled ignition, so little fuel is present that these feared autoignitions, for example, knocking cannot occur so readily.

(2) Additionally, the concentration of the fuel within the inner region of the combustion space offers the advantage of a stratification so that with a very lean fuel mixture, in relation to the total air quantity, a mixture is still present within the inner area of the combustion space the fuel-air mixture ratio of which is sufficient for externally applied ignition.

By reason of the relatively slight tendency to knock on the part of the internal combustion engine according to the present invention, it is possible to utilize a compression ratio which lies between that of the usual Otto engine and that of the usual diesel engine, especially within the range of between 1:10 and 1:14. The relatively high compression ratio has as consequence a good degree of efficiency which is noticeable by a favorable fuel consumption.

It is also note-wothy that the internal combustion engines constructed in accordance with the present invention are very insensitve to fuel and contain a considerably smaller content in poisonous carbon monoxide gases in the exhaust thereof than with usual gasoline injection-type combustion engines.

Accordingly, it is an object of the present in to provide an injection-type internal combustion engine which eliminates, in a simple and effective manner, the shortcomings of the prior art constructions.

It is another object of the present invention to provide an injection-type internal combustion engine or gasoline engine which assures favorable fuel-air mixture ratios even with relatively small injection quantities.

Still another object of the present invention resides in the provision of an injection-type gasoline engine which permits the use of relatively higher compression ratios, lying essentially within the range between 1:10 and 1:14 to thereby produce an increase in the efficiency of the engine.

A still further object of the present invention resides in the provision of a gasoline injection-type internal combustion engine which provides a higher efficiency of operation, is less sensitive to the type of gasoline used and also reduces considerably the content of poisonous carbon monoxide gases contained in the exhausts thereof.

Still another object of the present invention resides in the provision of a gasoline injection-type internal combustion engine provided with timed applied ignition which effectively minimizes the dangers of uncontrolled self-ignition within parts of the combustion space.

A further object of the present invention resides in the provision of a gasoline injection-type combustion engine provided with externally controlled ignition in which the fuel is concentrated within the those areas of the combustion space normally ignited by the externally controlled ignition means while maintaining within the other areas an essentially lean fuel mixture so as to preclude auto-ignitions in these other areas.

Still another object of the present invention resides in the provision of a gasoline injection-type combustion engine provided with applied ignition in which the danger of knocking is significantly reduced.

Figure 2:
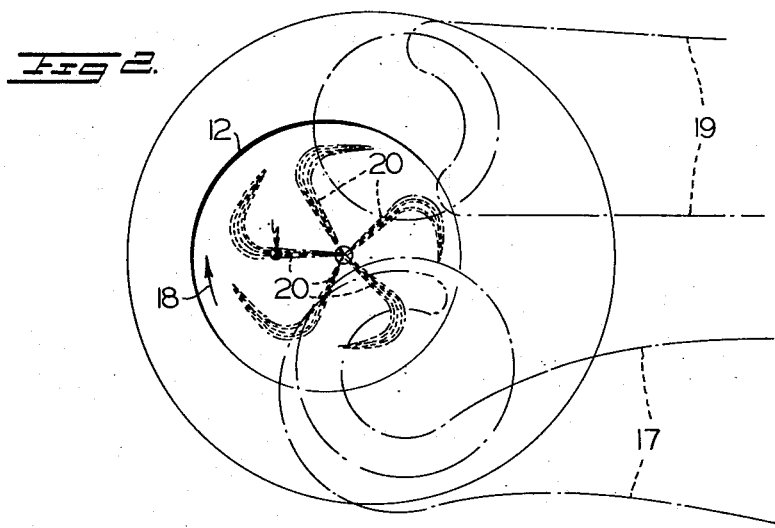

These and other objects, features and advantages of the present invention will become more obvious from the following description when taken in connection with the accompanying drawing which shows, for purposes of illustration only, one embodiment in accordance with the present invention, and wherein FIGURE 1 is a partial axial cross sectional view through the cylinder head, cylinder and piston of an internal combustion engine in accordance with the present invention, and FIGURE 2 is a plan view of FIGURE 1.

Referring now to the drawing wherein like reference numerals are used throughout the two views to designate corresponding parts, and more particularly to FIGURE 1, reference numeral 10 designates therein the piston provided with a compact combustion chamber 12 that is axially symmetrical about the axis 11. In the illustrted embodiment, the combustion chamber 12 is of semi-spherical shape, though it is understood that the present invention is not limited to this particular shape. For example, the combustion chamber may also be of any other appropriate shape, for instance, of cylindrical shape or of ω-shape. The term "compact" in connection with the combustion chamber 12 in the specification and claims herein describes a combustion chamber within the piston with a diameter that is considerably smaller than the diameter of the corresponding cylinder.

The injection nozzle 13 is constructed as a nozzle provided with five apertures which injects the fuel into the combustion space 12 almost in the transverse or diagonal direction of the piston. Approximately half-way between the orifice 14 of the injection nozzle 13 and the walls of the piston combustion chamber 12 are located the electrodes 15 of the spark plug 16. The inlet channel of which the walls are designated in FIGURES 1 and 2 by reference numeral 17 are curved in a spiral manner so that an eddying or vortex movement is imparted to the combustion air entering the cylinder which lasts until the combustion stroke. The direction of the eddy or vortex is indicated by arrow 18 in FIGURE 2. However, the air vortex or eddy can also be produced in any other suitable way or by any other known means, for example, by a deflector valve. The walls of the outlet channel are designated by reference numeral 19.

As may be readily seen from FIGURE 2, the fuel jets 20 which ordinarily would penetrate up to the walls of the piston combustion chamber 12 are deflected by the air vortex 18 out of their normal path so that a zone is formed along the circumference of the combustion chamber 12 which is either free of fuel or at least very lean in fuel.

While I have shown and described one embodiment in accordance with the present invention it is understood that the same is not limited thereto but is susceptible of many changes and modifications within the spirit and scope thereof. For example, the illustrated coordination between injection and piston position is shown only in a non-limitative manner. The fuel may be injected also, depending on the preselected compression ratio, on the strength of the air vortex and other operating conditions, in other positions of the piston.

Thus, it is obvious that the present invention is susceptible of many changes and modifications within the spirit and scope thereof and I, therefore, do not wish to be limited to the details shown and described herein but intend to cover all such changes and modifications as are encompassed by the scope of the appended claims.

I claim:

1. A method of operating a gasoline internal combustion engine having externally controlled applied ignition and including piston and cylinder means, said piston means being provided with a compact piston combustion chamber of a shape at least approximately axially symmetrical about a longitudinal axis and of diameter substantially smaller than the diameter of the cylinder space, means for producing air eddying within said combustion chamber about an axis extending essentially in the longitudinal direction of said piston means, and multi-aperture injection means for injecting the fuel essentially from the area of the longitudinal axis of said combustion chamber, comprising the steps of operating said gasoline combustion engine at a compression ratio of about 1:10 to 1:14 by injecting fuel substantially radially from said multi-aperture injection means into said combustion chamber and by so adjusting the magnitude of said air eddy and the penetrating force of the initially essentially radially moving fuel particles to each other that the fuel particles do not reach the walls of said piston-combustion chamber with the piston imagined in the dead center position thereof but are deflected prior thereto in the circumferential direction by said air eddy.

2. A method of operating a gasoline internal combustion engine having externally timed ignition, said engine including means forming a combustion chamber within the piston thereof, means for producing air eddying within said piston combustion chamber about an axis extending essentially in the longitudinal direction of said piston means, said piston combustion chamber being at least approximately axially symmetrical with respect to a longitudinal axis and of a diameter substantially smaller than the diameter of the cylinder space, and multi-aperture injection means for injecting the fuel essentially radially from the area of the longitudinal axis of said piston combustion chamber, comprising the steps of operating said gasoline internal combustion engine at a compression ratio of about 10:1 to 14:1 by injecting fuel substantially in the radial direction from said multi-aperture injection means into said combustion chamber and by so matching the strength of said air eddy and the penetrating force of the initially essentially radially moving fuel particles to each other that the fuel particles are deflected in the circumferential direction by said air eddy prior to reaching the cylinder walls.

3. A gasoline internal combustion engine operable with externally applied ignition and provided with piston and cylinder means, comprising means forming a piston combustion chamber of a configuration at least approximately axially symmetrical with respect to a longitudinal axis, said combustion chamber being constructed as compact piston combustion chamber of substantially smaller diameter than the cylinder diameter and dimensioned for a compression ratio between 1:10 and 1:14, multi-apertured fuel injection means for injecting fuel from within the area of said longitudinal axis substantially in radial directions, means for producing an air vortex within said combustion chamber about an axis extending substantially in the longitudinal direction of said cylinder means, the strength of said air vortex and the penetrating force of the initially substantially radially moving fuel particles being so matched to each other that the fuel particles fail to reach the walls of the cylinder space and of the combustion chamber with the piston means thought of in the upper dead center position thereof, but are deflected prior thereto essentially in the circumferential direction by said air vortex.

4. In an internal combustion engine having an air vortex about an axis extending in the longitudinal direction of the cylinder, a combustion space at least approximately axially symmetrical about a longitudinal axis, a fuel injection from within the area of the longitudinal axis of the combustion space provided with multi-apertured nozzle means, and means in the vicinity of the injection place for externally applied ignition means, the improvement essentially consisting of a combustion space constructed as compact piston-combustion-chamber of considerably smaller diameter than the diameter of the cylinder space and dimensioned for a compression ratio between 1:10 and 1:14, said multi-apertured nozzle means being operable to inject a plurality of substantially radially directed fuel jets into said combustion space from within the area of the longitudinal axis of the combustion space, and the strength of said air vortex and the penetrating force of the fuel particles initially moving substantially radially being so matched to each other that the fuel particles fail to reach the piston-combustion-chamber walls with the piston imagined in the upper dead center position but are deflected prior thereto in the circumferential direction.

References Cited in the file of this patent

UNITED STATES PATENTS

| 2,100,143 | Mock | Nov. 23, 1937 |
| 2,223,090 | Boxan | Nov. 26, 1940 |
| 2,269,104 | Hedlund | Jan. 6, 1942 |
| 2,709,992 | Graves | June 7, 1955 |
| 2,882,873 | Witzky | Apr. 21, 1959 |

FOREIGN PATENTS

| 57,751 | France | Apr. 22, 1953 |
| 185,122 | Great Britain | Oct. 18, 1923 |